Aug. 31, 1926.

J. B. NICHOLSON

SIGNAL DEVICE

Filed Oct. 9, 1923

1,598,358

Inventor

Joshua B. Nicholson

By

Attorney

Patented Aug. 31, 1926.

1,598,358

UNITED STATES PATENT OFFICE.

JOSHUA B. NICHOLSON, OF WASHINGTON, DISTRICT OF COLUMBIA.

SIGNAL DEVICE.

Application filed October 9, 1923. Serial No. 667,561.

My invention relates to signal lights for automobiles and has for its object to provide a simple, efficient and inexpensive device which is adapted to be attached to the side of the head light in such a manner that the driver of an automobile which is following closely will be enabled to tell the direction in which the automobile is about to turn.

A further object of my invention is to provide such a device which throws a ray of light rearward as a signal to the operator in the automobile following and yet not to blind him in any way.

With the above described objects and other objects hereinafter explained in view my invention consists in the construction and combination of elements hereinafter described and claimed.

Referring to the drawings:—

Figure 1:
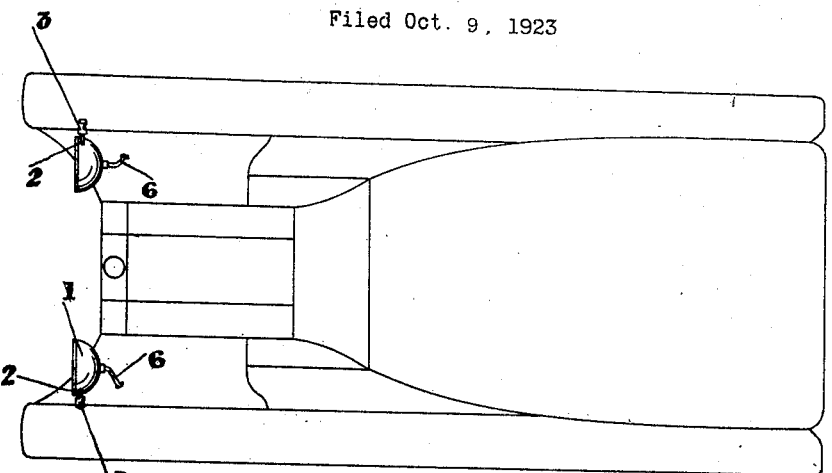
Figure 1 is a top plan view of an ordinary automobile showing my device as applied to the head lights.

In the drawings 1 indicates an ordinary head light of an automobile. 2 indicates a hollow stem the lower end of which is attached to the head light at a proper angle by means of soldering or other suitable means and has attached thereto at the upper end a removable hollow head 3 adapted to contain therein a bulb 4, said bulb seating itself on the ordinary contact points, the light of which is controlled by the hand switch 5. The wires 6 are connected to the contact points and pass through the rear of the head light to any suitable means for supplying the current.

In operation the light is placed on one or both sides of the automobile but preferably on the left side with the ray of light thrown towards the rear. The signal light is so arranged on the head light as to be visible to any driver following. As the automobile turns to the right the light turns with the rest of the car and is carried out of sight with respect to the driver of the following automobile which is a signal to him that the car is turning to the right. If the car is to turn to the left the following driver may see by the travel of the light towards the left that the automobile is about to turn to the left. The swinging movement of the headlights as the automobile swings to the right swings the signal light on the right hand headlight inward so that the rearwardly directed beam of light from it would be turned against the body of the automobile and would not be visible to one coming up directly behind. At the same time the signal light on the left hand head-light reflector would be swung outward so that its rearwardly directed beam would stand out with more than usual prominence.

Figure 2:
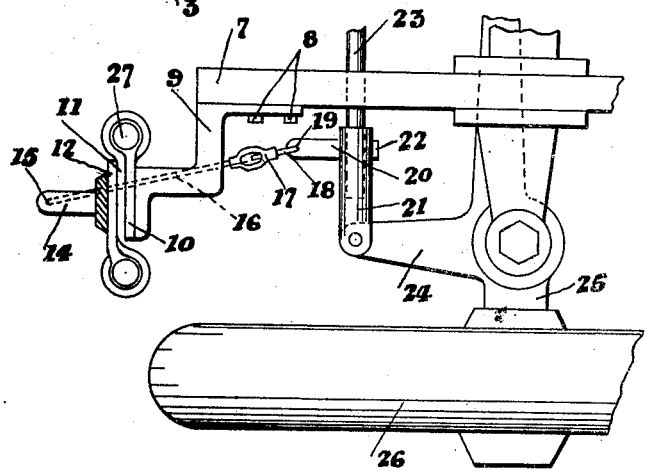
Figure 2 is a top partial section view of an automobile showing a means for turning dirigible lights to which my device may be attached.
Figure 3:
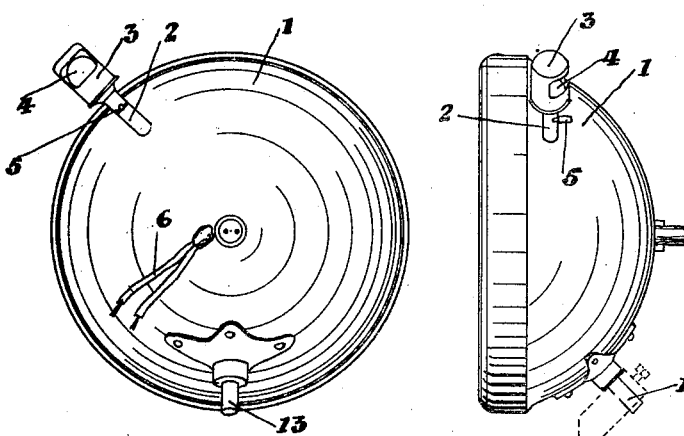
Figure 3 is a rear vertical view of the ordinary type of head light with my device attached thereto.
Figure 4:
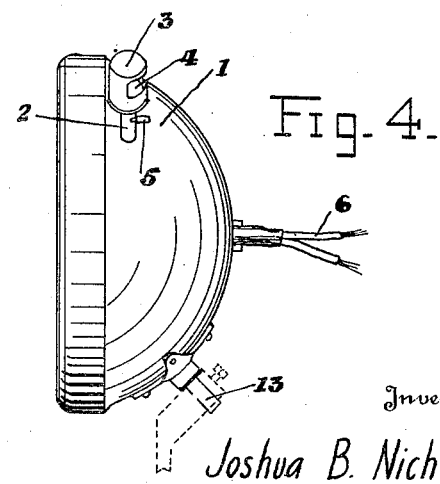
Figure 4 is a side elevational view of the same.

My device is further adaptable to dirigible head lights of the type described in the Letters Patent No. 936,437 granted to me and a partial section of which is shown in Figure 2. 7 indicates the chassis of an automobile which has attached thereto by means of bolts 8, one end of the bracket 9, the other end being attached to the rear leaf 10 of the double action spring 11. At the upper end of the forward leaf 12 is attached a suitable means for receiving the lug 13 of the head light 1 and holding it in rigid position. My device is attached to this head light the same as aforedescribed. On the lower end of the leaf 12 is attached a forwardly extending arm 14 containing in its forward end a hole 15 adapted to receive one end of the rod 16 while the other end of the rod is so constructed as to form a slidable joint within one end of the turn buckle 17. The other end of the turn buckle is internally screwthreaded to receive the screwthreaded end of the rod 18 while the other end is inserted through the hole 19 of the arm 20. This arm is attached to the under side of the socket 21 by means of bolts 22 which are to be found on the usual construction of cars. One end of the socket 21 is bored to a diameter suitable to receive one end of the rod 23 while the other end is pivotally connected to the forwardly extending arm 24 which arm is directly formed with the hub 25 of the wheel 26.

In the operation of this arrangement the signal light is placed to the rearward of the head light on an angle and high enough to enable a driver of a following automobile to see the light and yet not blind him. When the car is to turn to the right movement of the steering wheel causes the rod 23 to be moved to the right thereby carrying with it the forwardly extending arm 20. This arm causes a pull on the rod 16 which is attached to the arm 20 and the arm 14 and as the double hinge pivots about the bearing 27 the head light, which has the signal device attached thereto, is turned to the right causing the signal light to pass from view of the following driver which is a signal to him that the car is turning.

In turning to the left the opposite of that just described takes place except that the light does not pass from the observation of the following driver but is seen to turn to the left which is the signal to him.

Having thus described my invention what I claim is:—

In a signal device for automobiles the combination with a headlight mounted to turn on a vertical axis with the change of direction of the automobile and comprising a cup shaped reflector enclosing an electric light bulb, of a signal light mounted on the exterior of the reflector near its rim at a point above the horizontal plane through its center and outside the vertical plane through its axis, so constructed as to cast its beam rearward only and circuit connections for lighting the signal light at will.

In testimony whereof I hereunto affix my signature.

JOSHUA B. NICHOLSON.